(12) United States Patent
Manders

(10) Patent No.: US 9,227,488 B2
(45) Date of Patent: Jan. 5, 2016

(54) TENSIONING DEVICE AND SUNSCREEN ASSEMBLY PROVIDED THEREWITH

(75) Inventor: Peter Christiaan Leonardus Johannes Manders, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 261 days.

(21) Appl. No.: 12/264,577

(22) Filed: Nov. 4, 2008

(65) Prior Publication Data

US 2009/0114755 A1 May 7, 2009

(30) Foreign Application Priority Data

Nov. 6, 2007 (EP) .................................... 07120057

(51) Int. Cl.
*A47G 5/02* (2006.01)
*A47H 1/00* (2006.01)
*B60J 1/20* (2006.01)
*B60J 3/00* (2006.01)
(Continued)

(52) U.S. Cl.
CPC .............. *B60J 7/0015* (2013.01); *B60J 1/2058* (2013.01); *B60J 1/2061* (2013.01)

(58) Field of Classification Search
CPC ...... B60J 7/0015; B60J 1/2061; B60J 1/2058; B60J 1/2033; E06B 2009/785; E06B 9/54
USPC ......... 160/192, 238, 245, 294, 301, 298, 299, 160/305, 313, 314, 315, 318, 321, 309, 319, 160/322, 323 R, 274
See application file for complete search history.

(56) References Cited

U.S. PATENT DOCUMENTS 2,145,666 A * 1/1939 Roethel ...................... 192/223.3
3,135,369 A * 6/1964 Nisenson et al. .......... 192/223.4
(Continued)

FOREIGN PATENT DOCUMENTS

DE 19834777 A1 2/2000
EP 1626152 A 2/2006
(Continued)

OTHER PUBLICATIONS

Official Search Report of the European Patent Office in counterpart foreign application No. 07120057.0 filed Nov. 6, 2007.
(Continued)

*Primary Examiner* — Syed A Islam
*Assistant Examiner* — Jeremy Ramsey
(74) *Attorney, Agent, or Firm* — Steven M. Koehler; Westman, Champlin & Koehler, P.A.

(57) ABSTRACT

A tensioning device for tensioning a flexible elongate member, such as a cord, comprises a first winding member which can rotate around an axle for, directly or indirectly, winding and unwinding the elongate member at a first end thereof, and a second winding member which can rotate around said axle for, directly or indirectly, winding and unwinding the elongate member at the second end thereof. The first and second winding members are interconnected by a tensioning member striving to cause a relative rotation between the first and second winding members for creating a prestress or tension in the elongate member. A restriction device is provided for limiting the maximum possible relative rotation between the first and second winding members.

20 Claims, 2 Drawing Sheets

(51) Int. Cl.
*B60J 11/00* (2006.01)
*B60J 7/00* (2006.01)

(56) References Cited

U.S. PATENT DOCUMENTS 4,779,662 A * 10/1988 Wilk .............................. 160/321
2003/0178158 A1* 9/2003 Schulte ......................... 160/191

FOREIGN PATENT DOCUMENTS

| JP | 63-21171 | 6/1988 |
| JP | 08170477 | 2/1996 |
| JP | 200213599 | 8/2000 |
| JP | 2003214073 | 7/2003 |
| JP | 2003-239660 | 8/2003 |
| JP | 2006234116 | 9/2006 |

OTHER PUBLICATIONS

Notice of Reasons for Rejection for corresponding JP Application No. 2008-283568, mailed Mar. 26, 2013.

* cited by examiner

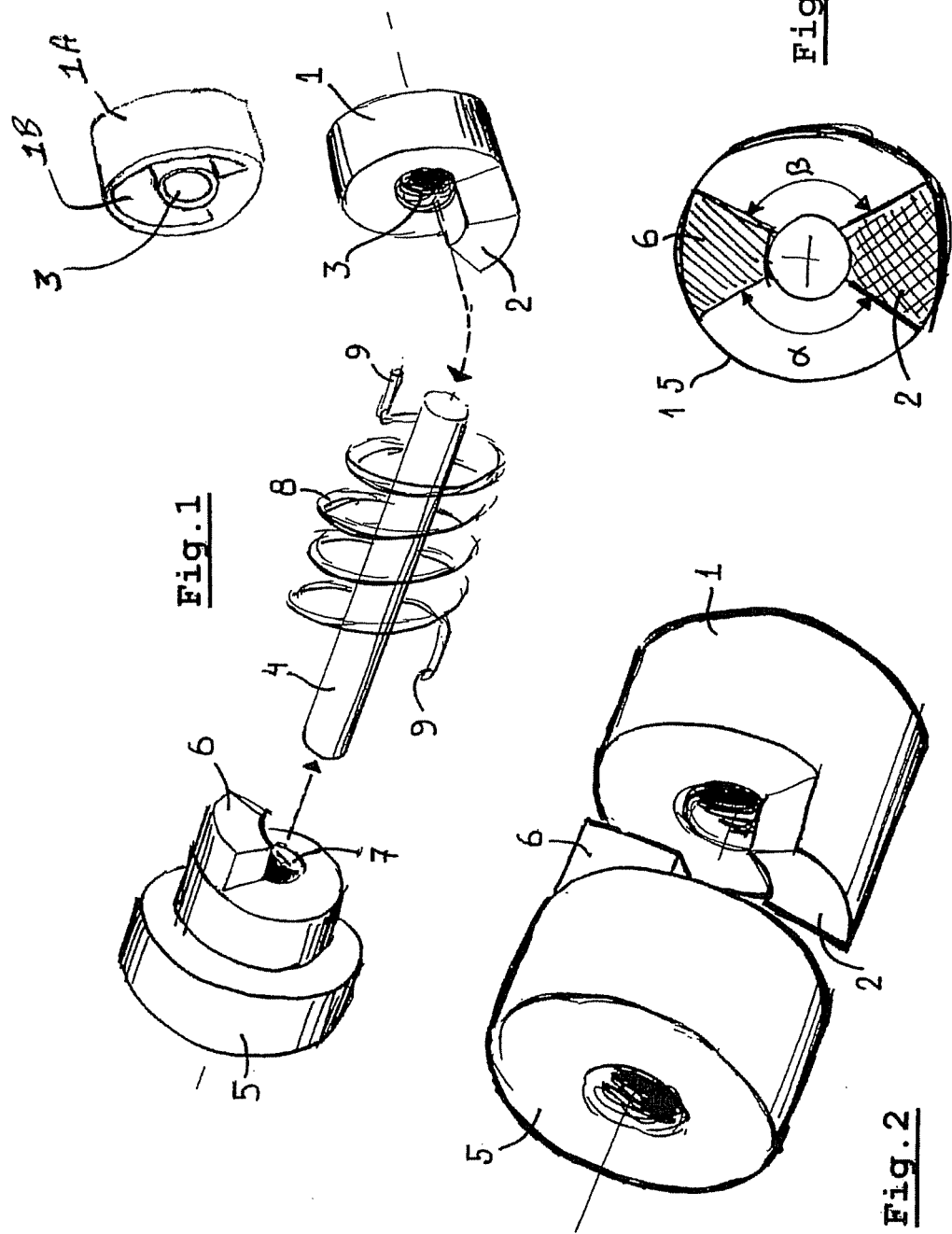

TENSIONING DEVICE AND SUNSCREEN ASSEMBLY PROVIDED THEREWITH

BACKGROUND

The discussion below is merely provided for general background information and is not intended to be used as an aid in determining the scope of the claimed subject matter.

An aspect of invention firstly relates to a tensioning device for tensioning a flexible elongate member, such as a cord, comprising a first winding member which can rotate around an axle for, directly or indirectly, winding and unwinding the elongate member at a first end thereof, and a second winding member which can rotate around said axle for, directly or indirectly, tensioning the elongate member at the second end thereof, wherein the first and second winding members are interconnected by a tensioning member striving to cause a relative rotation between the first and second winding members for creating a prestress or tension in the elongate member.

For example such a tensioning device is applied in a sunscreen assembly, comprising a winding shaft which can rotate around an axle for winding and unwinding a sunscreen. A free end of the sunscreen remote from the winding shaft is engaged by a first end of the flexible elongate member which extends around a reversal roller and which has a second end that can be wound and unwound by a winding disk which can rotate around said axle. Here, the winding shaft defines the first winding member and the winding disk defines the second winding member of the tensioning device interconnected by, generally, a coil spring.

This known tensioning device, however, has the disadvantage that when the first end of the elongate member (in the above sunscreen assembly being attached to the sunscreen) is moved towards the first winding member (in the above sunscreen assembly that means when winding the sunscreen onto the winding shaft) too quickly, the inertia of the winding shaft may prevent the elongate member from being maintained in a taut state at its first end (in the above sunscreen assembly that means that the sunscreen is not kept taut), such that it will slack, resulting in an irregular winding thereof onto the first winding member (winding shaft). Moreover, when the first end of the elongate member (in the above sunscreen assembly being attached to the sunscreen) is moved away from the first winding member (in the above sunscreen assembly that means when winding off the sunscreen from the winding shaft) too quickly, the inertia of the second winding member (the winding disk of the sunscreen assembly) may prevent the elongate member from being maintained in a taut state, such that it will slack, resulting in a loss of function of the tensioning device.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As an aspect of the invention, the tensioning device includes a restriction device configured to limit the maximum possible relative rotation between the first and second winding members.

The allowable amount of rotation between the first and second winding members may be chosen such that the elongate member will remain taut in all situations. Further the inventive concept allows the first and second winding members to be assembled in a pre-tensioned state before the elongate member is provided (in a sunscreen assembly that means before the sunscreen is applied).

There are many ways for limiting said maximum possible rotation. For example, the restriction device may comprise cooperating provisions on the first and second winding members, such as projections on the first and second winding members. However, as an example of an alternative embodiment cooperating projections and recesses on the first and second winding members can be used.

Preferably the restriction device limits the maximum possible relative rotation between the first and second winding members to less than one revolution.

Further it is possible that the tensioning member is a spring, such as a coil spring. However, any other appropriate tensioning member may be applied as well.

A second aspect of the invention relates to a sunscreen assembly comprising a winding shaft which can rotate around an axle for winding and unwinding a sunscreen, said sunscreen having a free end remote from the winding shaft which is engaged by a first end of a flexible elongate member which extends around a reversal roller and which elongate member has a second end that can be wound and unwound by a winding disk which can rotate around said axle. The winding shaft and the winding disk define a first winding member and second winding member, respectively, of a tensioning device.

Such a sunscreen assembly may be provided in an open roof construction of a vehicle comprising a roof opening in a stationary roof part which can be opened and closed by a movable roof panel.

BRIEF DESCRIPTION OF THE DRAWINGS

Hereinafter the invention will be elucidated while referring to the drawing, in which FIG. 1 illustrates, schematically and perspectively, part of a tensioning device previously to assembling;

FIG. 2 illustrates, on a larger scale, the relative position of some of the parts of FIG. 1 after assembling;

FIG. 3 illustrates the possibility of rotation between the parts of FIG. 2.

DETAILED DESCRIPTION OF THE ILLUSTRATIVE EMBODIMENT

Figure 4:
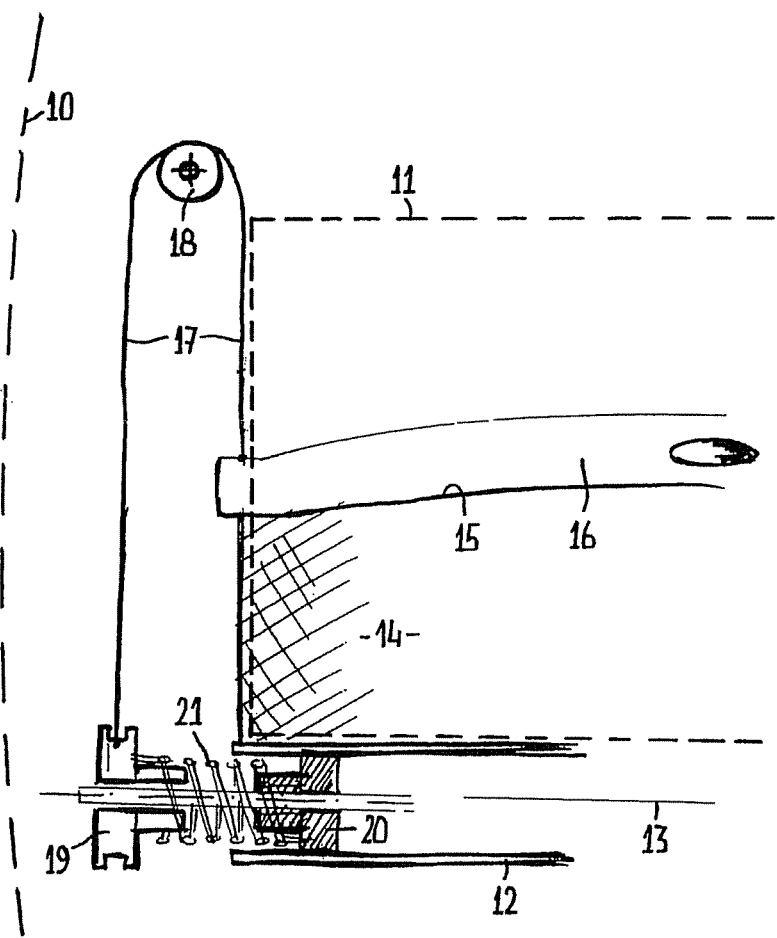
FIG. 4 illustrates, in a top plan view and schematically, a sunscreen assembly with tensioning device.

Firstly referring to FIG. 1, a few parts of a tensioning device are illustrated before assembling. A first winding member 1 is shown comprising a first projection 2. The first winding member 1 is provided with a central opening 3 for receiving therein an axle 4. Likewise, a second winding member 5 is provided with a second projection 6 and a central opening 7 for receiving therein the axle 4. Finally, the axle 4 is surrounded by a coil spring 8 having opposite ends 9 which are to be connected (in a manner not shown in detail) to the first and second winding members 1 and 5, respectively.

The first and second winding members 1 and 5, respectively, are mounted on the axle 4 for a relative rotation between said winding members. It is possible, therefore, that both winding members 1 and 5 can rotate relative to the axle 4, or that one of said winding members, for example winding member 1, is fixed to the axle 4 (such that said axle 4 rotates along with said winding member).

In an assembled position the projections 2 and 6 of the winding members 1 and 5, respectively, are designed to assume a position, in which a relative rotation between said winding members eventually will lead to an engagement of opposed surfaces between said projections 2 and 6. In FIG. 2 such an assembled position of the winding members 1 and 5 has been represented on a larger scale. It is noted, that in FIG. 2 the axle 4 and coil spring 8 have not been illustrated.

It will be clear that the cooperation between the projections 2 and 6 of the winding members 1 and 5, respectively, will define a maximum possible relative rotation between the first and second winding members 1 and 5, respectively. Such maximum possible relative rotation has been indicated in FIG. 3 by angles α and β. FIG. 3 shows the position of the projections 2 and 6 in a starting position of the winding members 1 and 5, respectively, (which starting position, for example, may be a position in which no external loads are applied to the tensioning device, apart from any prestress or loading from the coil spring 8). The indicated angle α represents the maximum possible relative rotation between the winding members 1 and 5 in a first sense of rotation, whereas the angle β represents the maximal possible relative rotation between the winding members 1 and 5 in the opposite sense of rotation. Of course, it may be possible that angle α equals angle β.

From FIG. 3 it further follows immediately, that the shape and position of the projections 2 and 6 may be configured to amend the maximal possible relative rotation between the first and second winding members 1 and 5, respectively, as needed. Further it will be clear that the number of projections on the winding members may differ from what has been illustrated. Also, other provisions on the winding members 1 and 5 may be made acting as a restriction mechanism for limiting the maximum possible relative rotation between the winding members. In other words, as appreciated by those skilled in the art, the engaging surfaces that limit rotation can be formed on outer structures. For example referring back to FIG. 1, the engaging surfaces of a winding member 1A can be provided as inner wall(s) of a partial annular recess 1B, where the recess 1B receives the projection 6 on the other winding member 5.

Further it is noted, that the allowed maximum possible relative rotation between the first and second winding members 1 and 5, respectively, should be large enough not to hinder the relative rotation needed for a normal operation of the tensioning device or any apparatus in which the tensioning device is incorporated.

FIG. 4 illustrates a possible use of the tensioning device according to the present invention. In dotted lines schematically part of a stationary roof 10 of a vehicle is represented in which a roof opening 11 is provided. The roof opening 11 is part of an open roof construction and can be opened and closed by a movable roof panel (not illustrated) and which further comprises a sun screen assembly. The sun screen assembly comprises a winding shaft or tube 12 which can rotate around an axle 13 (mounted to the stationary roof 10 of the vehicle).

A sunscreen 14 is provided of which a first end can be wound onto or off the winding shaft 12. The sunscreen 14 comprises a second end 15 remote from its first end attached to a pull bar 16. The pull bar 16 may be moved manually along guides (not illustrated but well known in the art) extending longitudinally along the sides of the roof opening 11, during winding or unwinding the sun screen 14.

A flexible elongate member 17 (for example a cord) has a first end engaging the pull bar 16. The elongate member 17 extends around a reversal roller 18 and has a second end that can be wound and unwound by a winding disk 19 which can rotate around axle 13.

Internally of the winding shaft 12 and attached thereto non-rotatably, a member 20 is provided. Winding disk 19 and member 20 are interconnected by a coil spring 21.

Member 20 and winding disk 19 correspond with the first winding member 1 and second winding member 5 according to FIGS. 1-3, and therefore are provided with a cooperating restrictions device having engaging surfaces for limiting the maximum possible relative rotation between the member 20 (and therefore winding shaft 12) and winding disk 19. Such restriction device, for example cooperating projections as discussed above, have not been illustrated in FIG. 4.

The coil spring 21 is prestressed or loaded in such a manner that, during normal operation of the illustrated sunscreen assembly, elongate member 17 (and, therefore, sunscreen 14) is kept taut. Winding the sunscreen 14 off from the winding shaft 12 correspondingly leads to winding elongate member 17 onto winding disk 19, for example. However, when pull bar 16 is moved manually very quickly in a direction towards the winding shaft 12 for winding the sunscreen 14, the inertia of the winding shaft 12 will prevent an immediate corresponding winding of the sunscreen 14 onto the winding shaft 12. The resultant relative rotation between member 20 and winding disk 19 then will lead to an engagement between the engaging surfaces of the restriction device (for example projections on the member 20 and winding disk 19), at which moment member 20 (and thus winding shaft 12) will rotate along with the winding disk 19 for winding the sunscreen 14 onto the winding shaft 12 before the sunscreen 14 becomes slack. Shortly thereafter the winding member 20 again will assume its normal rotational position relative to winding disk 19 as defined by the prestress or load of the coil spring 21. Conversely, when pull bar 16 is moved manually very quickly in a direction away from the winding shaft 12 for unwinding the sunscreen 14, the inertia of the winding disk 19 and elongate member 17 may prevent an immediate corresponding winding of the elongate member 17 onto the winding disk 19. The resultant relative rotation between member 20 and winding disk 19 then also will lead to an engagement between the engaging surfaces of the restriction device (for example projections on the member 20 and winding disk 19), at which moment the winding disk 19 will rotate along with the member 20 for winding the elongate member 17 onto the winding disk 19 before the elongate member 17 becomes slack. Shortly thereafter the winding disk 19 again will assume its normal rotational position relative to member 20 as defined by the prestress or loading of the coil spring 21.

It is noted, that FIG. 4 only shows one half of an open roof construction provided with a sunscreen assembly.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A tensioning apparatus, comprising:
an axle;
a first winding member arranged to rotate around the axle;
a second winding member arranged to rotate around the axle wherein portions of the first and second winding members form a restriction device arranged to limit a maximum relative rotation between the first and second winding members;
a flexible elongate member coupled to the first winding member at a first end of the flexible elongate member and coupled to the second winding member at a second end of the flexible elongate member; and
a tensioning member connecting the first winding member to the second winding member to create tension in response to relative rotation between the first and second winding members to create tension in the flexible elongate member;
wherein in a starting position of the first winding member and the second winding member relative positions of portions of the first winding member and the second winding member which form a restriction device allow the relative rotation between the first winding member and the second winding member in two opposite directions.

2. The tensioning apparatus according to claim 1, wherein the restriction device comprises engaging surfaces of the first and second winding members.

3. The tensioning apparatus according to claim 2, wherein the engaging surfaces comprise a first projection on the first winding member and a second projection on the second winding member.

4. The tensioning apparatus according to claim 2, wherein at least one of the engaging surfaces comprise surfaces forming a recess.

5. The tensioning apparatus according to claim 1 wherein the restriction device limits the maximum relative rotation between the first and second winding members to less than one revolution.

6. The tensioning, apparatus according to claim 1, wherein the tensioning member is a coil spring.

7. The tensioning apparatus of claim 1 comprising a sunscreen assembly, the sunscreen assembly comprising:
a winding disk joined to the first winding member;
a winding shaft joined to the second winding member;
a reversal roller spaced apart from the winding disk and the flexible member is wound about the reversal roller and the first end of the flexible member is coupled to the winding disk and the second end of the flexible member is coupled to the winding shaft; and
a flexible sunscreen having a first end and a second end, the first end of the sunscreen joined to the winding shaft for winding thereon and the second end of the sunscreen joined to the second end of the flexible elongate member.

8. The tensioning assembly according to claim 7 assembled in an open roof construction of a vehicle comprising a roof opening in a stationary roof part which can be opened and closed by a movable roof panel and the flexible sunscreen being opened and closed via rotation of the winding shaft.

9. A tensioning apparatus, comprising:
a reversing roller;
a first winding member spaced apart from the reversing roller and supported for rotation, the first winding member having a first engaging surface;
a second winding member spaced apart from the reversing roller and supported for rotation the second winding member having a second engaging surface, the second winding member being disposed adjacent the first winding member such that the first engaging surface will engage the second engaging surface to form a restriction device arranged to limit a maximum relative rotation between the first and second winding members in two opposite directions in a starting position of the winding disk and the winding shaft;
a flexible elongate member extending over the reversing roller and interconnecting the first winding member to the second winding member via a first connection operably connecting a first end of the flexible elongate member to the first winding member and a second connection operably connecting a second end of the flexible elongate member to the second winding member; and
a tensioning member connecting the first winding member to the second winding member and arranged to cause relative rotation between the first and second winding members to create tension in the flexible elongate member.

10. The tensioning apparatus according to claim 9 wherein the restriction device limits the maximum relative rotation between the first and second winding members to less than one revolution and the restriction device is configured to allow at least a half a revolution of relative motion between the first and second winding members.

11. The tensioning apparatus according to claim 10, wherein the first engaging surface is formed on a first projection on the first winding member and the second engaging surface is formed on a second projection on the second winding member.

12. The tensioning apparatus according to claim 10, wherein the first engaging surface is formed on a first projection on the first winding member and the second engaging surface is formed on an inner wall of a recess of the second engaging member.

13. The tensioning apparatus according to claim 10, wherein the tensioning member is a coil spring.

14. The tensioning apparatus of claim 9 and further comprising:
a winding disk joined to the first winding member;
a winding shaft joined to the second winding member; and
a flexible sunscreen having a first end and a second end, the first end of the sunscreen joined to the winding shaft arranged for winding thereon and the second end of the sunscreen joined to the second end of the flexible elongate member.

15. The tensioning apparatus of claim 9 and further comprising a common axle for supporting the first winding member and the second winding member.

16. The tensioning apparatus of claim 1 wherein the second end of the flexible elongate member is coupled to a sunscreen which is connected to a shaft coupled to the second winding member to connect the second end of the flexible elongate member to the second winding member.

17. The tensioning apparatus of claim 1 wherein the flexible elongate member is wound about a reversal roller spaced from the first and second winding members.

18. The tensioning apparatus of claim 7 wherein the winding disk includes an annular groove to wind and unwinding the elongate flexible member.

19. The tensioning apparatus of claim 9 comprising a sunscreen coupled to the second winding member through a winding shaft and an end of the elongate flexible member is coupled to the winding shaft through connection to a pull bar coupled to the sunscreen.

20. A sunscreen assembly for provision in an open roof construction of a vehicle, comprising:
a sunscreen;
a reversal roller;
a flexible elongate member extending around the reversal roller;

a winding disk;

a tensioning member connected between the winding disk and the winding shaft; and a winding shaft rotatable around an axis for winding and unwinding the sunscreen, the sunscreen including a free end remote from the winding shaft which is engaged by a first end of the flexible elongate member extending around the reversal roller and having a second end that can be wound and unwound by the winding disk which can rotate around the axis;

wherein the winding disk and winding shaft are interconnected by the tensioning member striving to cause a relative rotation between the winding disk and winding shaft for creating tension in the flexible elongate member and thus in the sunscreen, wherein portions of the winding shaft and winding disk form a restriction device which is provided for limiting the maximum possible relative rotation between the winding disk and winding shaft and wherein in a starting position of the winding disk and winding shaft, the relative position of the portions of the winding shaft and winding disk which form the restriction device allow a relative rotation between the winding disk and winding shaft in two opposite directions.

* * * * *